(12) United States Patent
Zametzky

(10) Patent No.: US 7,949,235 B2
(45) Date of Patent: May 24, 2011

(54) ELECTRONIC MODULE AND ARRANGEMENT FOR SIGNAL TRANSMISSION WITH THE FORMER

(75) Inventor: Klaus Zametzky, Schwabach (DE)

(73) Assignee: SITRONIC Ges. fuer elektrotechnische Ausruestung mbH & Co. KG, Gaertingen (DE)

( * ) Notice: Subject to any disclaimer, the term of this patent is extended or adjusted under 35 U.S.C. 154(b) by 445 days.

(21) Appl. No.: 12/214,618

(22) Filed: Jun. 20, 2008

(65) Prior Publication Data
US 2008/0317446 A1 Dec. 25, 2008

(30) Foreign Application Priority Data
Jun. 25, 2007 (DE) .................. 10 2007 029 526

(51) Int. Cl.
*H02P 7/29* (2006.01)
(52) U.S. Cl. .......... 388/831; 388/811; 318/268; 318/266
(58) Field of Classification Search .................. 318/268, 318/266, 430, 461, 471; 388/811, 831
See application file for complete search history.

(56) References Cited

U.S. PATENT DOCUMENTS

| | | | |
|---|---|---|---|
| 4,357,495 A | | 11/1982 | Sweet et al. |
| 6,823,681 B2 * | | 11/2004 | Hirose et al. .................... 62/133 |
| 7,323,836 B2 * | | 1/2008 | Lin et al. ........................ 318/268 |
| 7,394,215 B2 * | | 7/2008 | Tsai et al. ...................... 318/461 |
| 7,525,271 B2 * | | 4/2009 | Chen et al. ..................... 318/434 |
| 7,623,770 B2 * | | 11/2009 | Chang et al. ................... 388/811 |
| 7,705,572 B2 * | | 4/2010 | Yin et al. ....................... 323/273 |
| 2004/0251942 A1 * | | 12/2004 | Chiu et al. ..................... 327/172 |
| 2004/0263105 A1 * | | 12/2004 | Tsai et al. ...................... 318/471 |
| 2006/0043950 A1 * | | 3/2006 | Lin et al. ....................... 323/282 |
| 2007/0019935 A1 * | | 1/2007 | Hsieh et al. .................... 388/811 |
| 2007/0216458 A1 * | | 9/2007 | Chiu et al. ..................... 327/175 |
| 2008/0088268 A1 * | | 4/2008 | Sakaguchi ..................... 318/471 |
| 2008/0250045 A1 * | | 10/2008 | Balassanian et al. .......... 707/101 |
| 2008/0272724 A1 * | | 11/2008 | Hayashi ......................... 318/430 |
| 2009/0034943 A1 * | | 2/2009 | Ma .................................. 388/811 |

FOREIGN PATENT DOCUMENTS

| | | |
|---|---|---|
| DE | 30 42 608 C2 | 3/1983 |
| DE | 10 2004 018 169 A1 | 11/2005 |

* cited by examiner

*Primary Examiner* — Paul Ip
(74) *Attorney, Agent, or Firm* — Walter A. Hackler

(57) ABSTRACT

The invention concerns an electronic module for a motor vehicle, in particular a fan regulator (4″) with a control input (S) for a signal, in particular a pulse width modulated signal, transmitted via a signal line (3). The electronic module is designed for the generation of an essentially constant potential ($U_{bias}$, $U_{bias}-U_{BE}$) at the control input (S), which preferably is designed as a current-controlled, low resistance control input. The invention also concerns an arrangement (1″) for the transmission of a preferably pulse width modulated signal with: a control device (2′) for the generation of the signal, a signal line for the transmission of the signal, and an electronic module as described above.

10 Claims, 2 Drawing Sheets

ELECTRONIC MODULE AND ARRANGEMENT FOR SIGNAL TRANSMISSION WITH THE FORMER

The invention concerns an electronic module for a motor vehicle, in particular a fan regulator, with a signal input for a signal, in particular a pulse width modulated signal, transmitted over a signal line, as well as an arrangement for the transmission of the signal with such an electronic module for the reception of the signal.

For the transmission of analogue control quantities from a control device as a transmitter to a controlled electronic module as a receiver, e.g. on a fan regulator, a pulse width modulated signal is often used in motor vehicles as a carrier signal, since such a signal is insensitive to ground offset voltages between transmitter and receiver.

Figure 3:
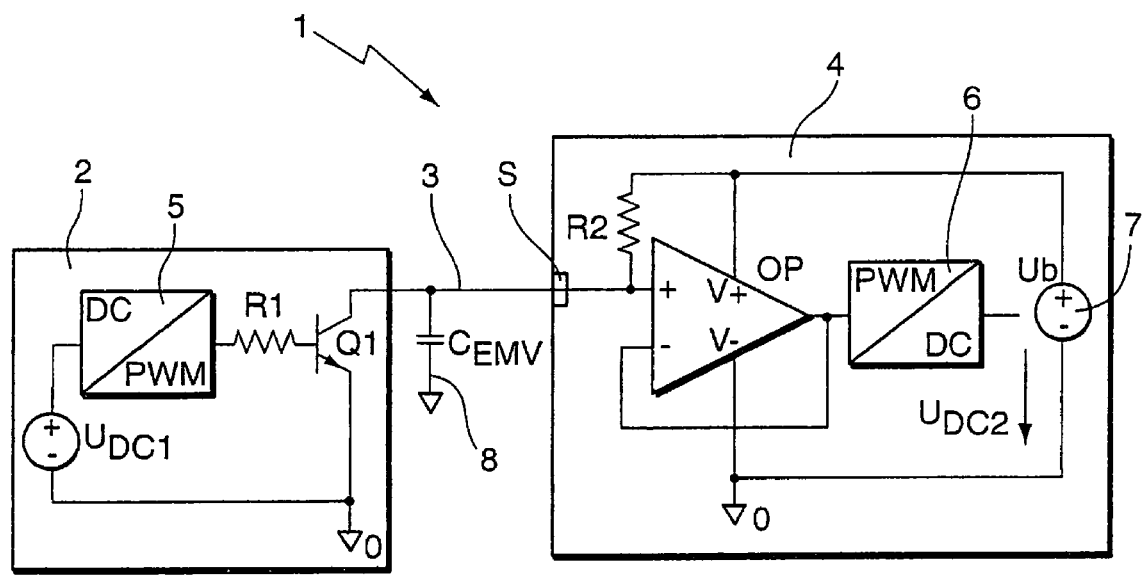

A circuit diagram of an arrangement 1 for the transmission of such a signal, as is known from the prior art, is shown in FIG. 3. From a control device 2, e.g. for the control of an air conditioning system, as a transmitter a first DC voltage $U_{DC1}$ is to be transmitted via a signal line 3 to a control input S of a fan regulator 4 as a receiver, which uses a second DC voltage $U_{DC2}$ for the control of a fan motor, which in the event of ideal transmission corresponds to the first DC voltage $U_{DC1}$. The first DC voltage $U_{DC1}$ is converted in a DC/PWM converter 5 of the control device 2 into a pulse width modulated (PWM) signal, which is supplied via a first resistance R1 to a bipolar transistor Q1. It is to be understood that alternatively the PWM signal can also be generated directly from a microcontroller (not shown).

The PWM signal serves to control the base current of the transistor Q1, which is operating as a switch, and switches on and off in accordance with the pulse-pause ratio of the PWM signal. The transistor Q1 is operating in the so-called open collector mode, i.e. in common emitter circuit mode, in which a second resistance R2 is arranged as a collector resistance, not in the control unit 2, but in the fan regulator 4. Control units with such an open collector stage are encountered very frequently, since they can be implemented simply and cost-effectively.

As already stated, the fan regulator 4 includes the collector resistance R2 as a pull-up resistance, a differential amplifier OP, which is operating as an impedance converter (voltage follower) for the voltage on the second resistance R2, and which drives a PWM/DC-converter 6 with a low pass filter, which reconverts the received pulse width modulated signal into the second DC voltage $U_{DC2}$. In the fan regulator 4 furthermore a voltage source 7 is provided for the generation of a constant supply voltage $U_b$ of typically 12 V.

In the car sector, where the cost pressures are very great, the signal line 3 is normally not screened. The non-screened signal line 3 transports the switching flanks of the pulse width modulated signal, is therefore afflicted with dU/dt disturbances and can reduce the electromagnetic compatibility (EMC) of the arrangement 1, since the electric field strength around the signal line 3 changes abruptly with each switching flank. This can lead to disturbances on modules arranged in the vicinity of the signal line 3; the latter has to be directed past these modules because of the small build volume available in the car. In order to limit the rise rate of the flanks a capacitor 8 with a capacitance $C_{EMV}$ is provided to suppress the interference caused by the signal line 3. The interference suppression capacitance $C_{EMV}$ limits the rate of voltage variation dU/dt on the signal line 3 and reduces the transient electrical field strength emitted from the signal line 3. In an exemplary manner the capacitor 8 is here arranged in the centre of the signal line 3, it can, however, also be integrated into the control device 2 or the fan regulator 4.

Since the capacitor 8 is discharged more quickly through the transistor Q1 than it is charged up through the resistance R2, the end result is asymmetrical distortions of the signal flanks on the signal line 3. The signal line 3 alters the pulse duty factor and thus the information content of the pulse width modulated signal. This fact is disturbing if the second DC voltage $U_{DC2}$ should be equal to the first DC voltage $U_{DC1}$, which in practice is almost always what is required. This problem is countered by selecting a comparatively low frequency (e.g. 35 Hz) for the pulse width modulated signal. If the periodic duration of the pulse width modulated signal is large in comparison to the rise rate of the flank the error remains small.

However, a low frequency for the pulse width modulated signal requires a large integration time constant for the low pass filter in the PWM/DC-converter 6, and the fan regulator 4 therefore operates relatively slowly as a receiver. Since in the car industry alongside high quality and low failure rates reliable product testing is also required this inevitably leads to long testing times and high testing costs because the slow behaviour of the fan regulator 4 makes itself felt here in a troublesome manner. Thus, at the end of the production process many functions are tested, and before each measurement is taken there has to be a waiting time until the working point of the fan regulator 4 has stabilised. In the case of a PWM/DC-converter 6 with a large integration time constant this leads to long testing times and thus to high testing costs.

The object of the invention is to develop further an electronic module as well as an arrangement for the transmission of a preferably pulse width modulated signal of the type cited in the introduction such that the transient electric fields generated along the signal line are reduced without the end result being a deterioration of the signal transmission.

This object is achieved according to the invention by means of an electronic module that is designed for the generation of an essentially constant potential at the control input. According to the invention it is proposed to transmit a current signal instead of a voltage signal over the signal line. To this end the input of the electronic module is set at a constant potential, which also exists along the signal line so that hardly any dU/dt fluctuations in the signal voltage may occur along the line any longer. By this means the provision of capacitors to improve the EMC can be avoided, and thus signals with a higher cycle rate can also be transmitted without errors.

In a preferred embodiment the control input is embodied as a current-controlled, low resistance input with an input resistance of preferably 100Ω or less, in particular 10 mΩ or less. In contrast to this in the prior art, as it is described in FIG. 3, the control input is designed as a high resistance, voltage-controlled input. By means of the low resistance control input the current signal is fed inside the fan regulator and can be converted into a voltage at a resistance that is provided therein.

In a further advantageous embodiment a voltage generation unit is provided for the generation of the constant potential at the control input. The voltage generation unit can for this purpose branch off part of the supply voltage, which typically is significantly less than the latter and typically amounts to approximately one tenth of the supply voltage.

In an advantageous embodiment the electronic module includes a differential amplifier with one output and two inputs, of which the first is connected to the control input, and of which the second has a constant potential, wherein the differential amplifier is implemented as a current-voltage converter having a resistance between the first input and the output. In this case the low resistance, current-controlled input is formed on a current-voltage converter. This always controls its output such that equal potentials are present at both inputs. The constant potential present at the second input thus also is present at the first input, so that the control input and with it the signal line are at constant potential. At the same time the current signal of the signal line is converted at the resistance into a voltage signal amplified by the magnitude of the resistance.

In a particularly preferred alternative embodiment the electronic module includes a transistor operated in a common base circuit, whose base has a constant potential and whose emitter is connected to the control input. In this case a current-controlled, low resistance input is implemented in that a constant potential is applied to the base of the transistor, which, reduced by the base-emitter potential, is applied to the control input. The transistor in the electronic module forms, together with the transistor operated in an open collector mode in the control device, a cascode circuit configuration, with the special feature that the signal line connects the first stage of the cascode circuit, in a common emitter circuit configuration, with the second stage of the cascode circuit, in a common base circuit. The collector load of the first stage is here formed by the low input resistance of the stage in common base circuit. This embodiment has the advantage that the electronic module is constructed entirely with discrete components and thus ICs can be dispensed with, the latter being linked with high costs because of the demanding requirements placed on the components with regard to temperature stability in cars. It is to be understood that in place of one or both bipolar transistors FETs can also be provided, as a result of which, however, the circuitry costs in general increase.

In a particularly advantageous embodiment the electronic module has a PWM/DC-converter for the conversion of the pulse width modulated signal into a DC voltage. The DC voltage hereby generated can e.g. be used for the regulation of a fan motor, e.g. in that this serves as the target value for the voltage drop across the fan motor.

The invention is also implemented in an arrangement for the transmission of a preferably pulse width modulated signal with: a control device for the generation of the signal, a signal line for the transmission of the signal, and an electronic module as described above for the reception of the signal. The arrangement is designed for the transmission of a current signal, so that rapid fluctuations in voltage on the signal line can be avoided as far as possible and thus the EM compatibility of the arrangement can be increased.

In a particularly preferred embodiment the control device has a transistor operated in open collector mode, preferably operated in a common emitter circuit, to generate the signal. The transistor is here operating as a switch, which switches a current on or off via the signal line as a function of a switching signal that as a rule is pulse width modulated. The operation in a common emitter circuit has the advantage that the resistance arranged in the emitter circuit serves as a current sink and therefore its current drain is determined very accurately.

In a further advantageous embodiment the control device has a further converter unit for the conversion of a DC voltage into the pulse width modulated signal. Alternatively the pulse width modulated signal can also be directly generated in a microcontroller.

Figure 1:
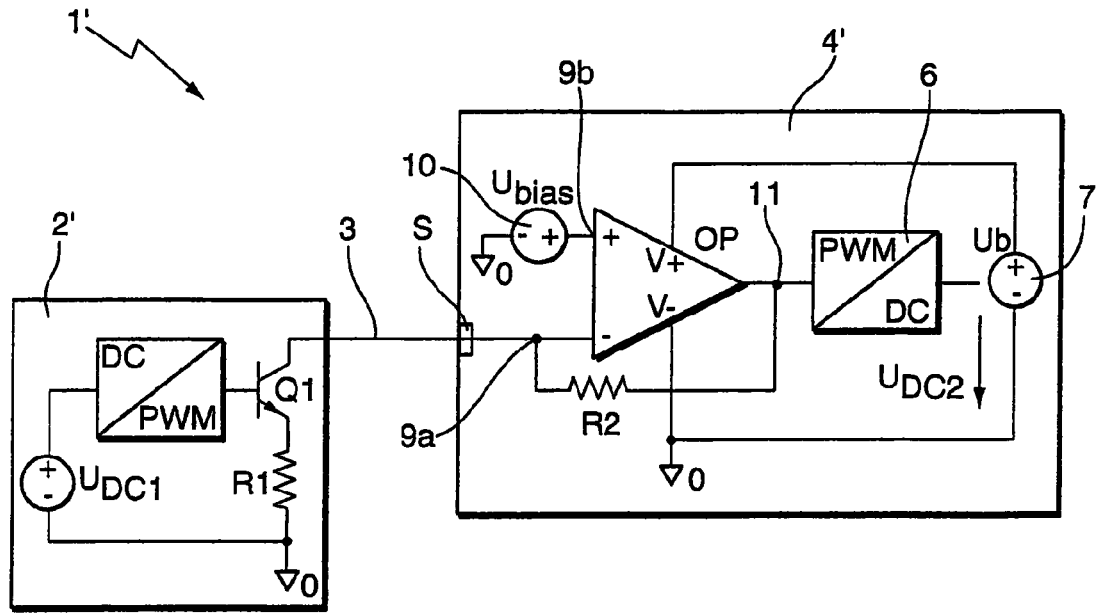
Figure 2:
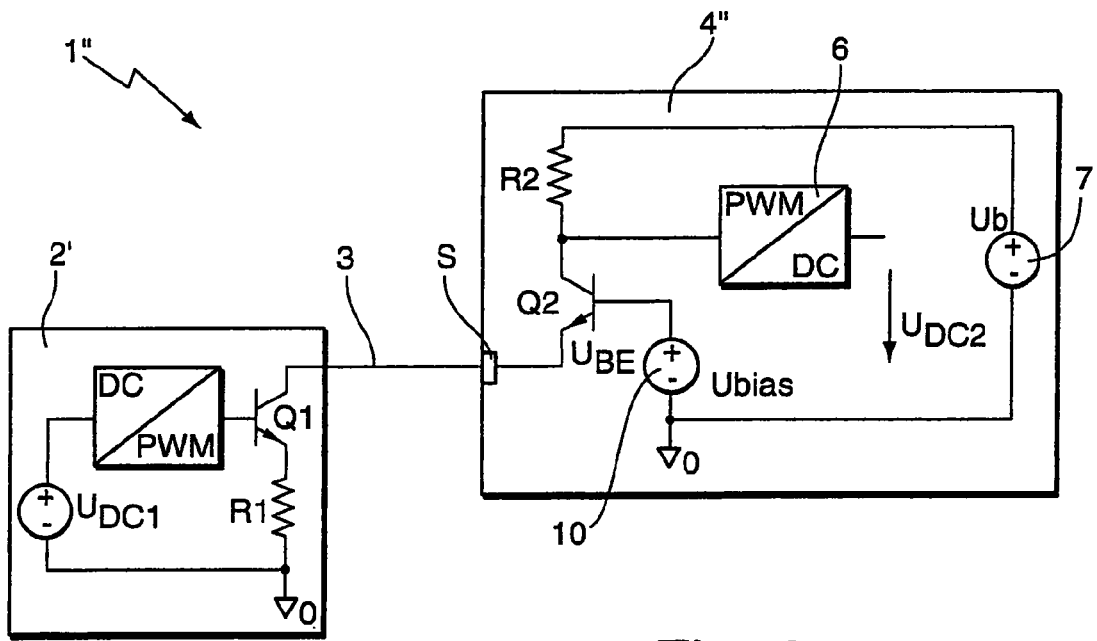

Examples of embodiments of the electronic module according to the invention and the arrangement are represented in the schematic drawings and are elucidated in the following description. In the figures:

FIG. 1 shows a circuit diagram of a first embodiment of the arrangement according to the invention for signal transmission with a current-voltage converter for the generation of a constant voltage, FIG. 2 shows a circuit diagram of a second form of embodiment of the arrangement according to the invention with a cascode circuit for the generation of the constant voltage, and FIG. 3 shows a circuit diagram of an arrangement for signal transmission according to the prior art.

FIG. 1 shows an arrangement 1' for the transmission of a pulse width modulated signal between a control device 2' and a fan regulator 4', which differs from the arrangement 1, described above in conjunction with FIG. 3, in the first instance on the transmitter side, in that the first resistance R1 is arranged in the emitter current circuit of the first transistor Q1, i.e. this is operating in common emitter circuit mode. A constant potential $U_{bias}$ in its collector circuit is hereby generated at the opposite end of the signal line 3 in the fan regulator 4' on a first input 9a of the differential amplifier OP implemented as a current-voltage converter in the circuit. For the generation of the constant potential $U_{bias}$ in the fan regulator 4' a voltage generation unit 10 is provided, which is connected to a second input 9b of the differential amplifier OP. The differential amplifier OP controls the voltage at its output 11 in a manner such that the constant potential $U_{bias}$ is also present at the first input 9a. By means of a second resistance R2 connected to the first input 9a and the output 11 a low resistance input of the fan regulator 4' is implemented and at the same time a conversion is implemented of the current signal transmitted via the signal line 3 into a voltage signal amplified by the magnitude of the second resistance R2. The voltage hereby generated from the current signal is supplied at the output 11 of the differential amplifier OP to the PWM/DC-converter 6.

Thus in the arrangement 1' shown in FIG. 1, in contrast to FIG. 3, instead of a voltage signal a current signal is transmitted via the signal line 3, so that no abrupt voltage fluctuations occur in the signal line 3 and therefore no transient electric fields can be generated, as a result of which the electromagnetic compatibility of the arrangement 1', i.e. of the signal line 3, is increased. The transmission of a current signal is made possible by the provision of a current-controlled, low resistance control input S at the fan regulator 4'. The input resistance $R_E$ of the control input S can lie in the mΩ range, and is given by $$R_E = \frac{R2}{A_{OL}+1},$$

where $A_{OL}$ indicates the loop amplification of the differential amplifier OP. For example, the second resistance R2 can have a magnitude of 1 kΩ and the loop amplification $A_{OL}$ can be approximately $10^5$, as a result of which an input resistance $R_E$ of 10 mΩ ensues.

An alternative implementation of the low resistance, current-controlled control input S on a fan regulator 4" of an arrangement 1" for signal transmission is represented in FIG. 2. While on the transmitter side the arrangement 1" corresponds to the arrangement 1' shown in FIG. 1, in the fan regulator 4" the differential amplifier OP is replaced by a second transistor Q2. The second transistor Q2 is operating in common base circuit mode and its base is connected to the voltage generation unit 10, so that the constant potential $U_{bias}$ is present on the base. An essentially constant potential is therefore present on the emitter of the second transistor Q2, reduced by the magnitude of the base-emitter voltage $U_{BE}$. The first transistor Q1 of the control unit 2' and the second transistor Q2 of the fan regulator 4" hereby form a cascode circuit configuration, whose two stages are connected via the signal line 3. On the emitter of the second transistor Q2 a low resistance, current-controlled control input S is hereby formed, as is required for the transmission of a current signal. In contrast to the fan regulator 4' shown in FIG. 1 the fan regulator 4" of FIG. 2 can be constructed from a small number of discrete components, so that this solution is particularly cost-effective.

The components of the fan regulators 4', 4" used for the regulation of the fan motor as a function of the second DC voltage $U_{DC2}$ are not represented in detail in FIG. 1 and FIG. 2, since these are known from the prior art. In particular, the further components of the fan regulators 4', 4" can be implemented as an analogue control circuit, e.g. as described in DE 10 2004 018 169 A1 of the applicant, or as a digital control circuit, wherein in the latter case typically a binary signal that is not pulse width modulated is transmitted via the signal line.

In both of the examples described above the signal line 3 does not generate any transient electric fields and thus increases the electromagnetic compatibility of the arrangements 1', 1". Furthermore the use of interference suppression capacitors on the signal line can be dispensed with, so that even with high-frequency pulse width modulated signals the signal flanks can be transmitted with high accuracy. Thereby the PWM/DC-converter can be operated in the fan regulator 4', 4" with a shorter time constant and the testing times and with them the costs for the testing of the fan regulator 4', 4" are reduced. Furthermore suitable dimensioning of the circuitry of the control device 2' can prevent the collector-base voltage on the first transistor Q1 from becoming negative, as is normally the case in the control device 2 of FIG. 3 with a switching first transistor Q1, so that the first transistor Q1 in the control device 2' always works in the normal operating mode, and thus with small delays.

It is to be understood that the above described concept of signal transmission can not only be performed with pulse width modulated signals, but also with other signals in which steep signal flanks occur, in particular also for the transmission of binary signals, if the fan regulator is designed for the processing of binary signals. Likewise this concept can advantageously be introduced not only for a fan regulator, but also for any other electronic modules to which a control signal is to be supplied via a signal line, in order to increase the electromagnetic compatibility.

What is claimed is:

1. An arrangement for transmission of a pulse-width modulated signals, the arrangement comprising:
   a control device for the generation of the pulse width modulated signal
   a signal line for the transmission of the pulse-width modulated signal as a current signal; and
   a fan regulator having a current-controlled input for the generation of an essentially constant potential ($U_{bias}$, $U_{bias}-U_{BE}$) at the current controlled input.

2. The arrangement according to claim 1, wherein the control input comprises a current-controlled, low resistance input with an input resistance of 100Ω or less.

3. The electronic arrangement according to claim 2, wherein the control input comprises a current-controlled, low resistance input with an input resistance of 10Ω or less.

4. The electronic arrangement according to claim 1 further comprises a voltage generation unit for the generation of the constant potential ($U_{bias}$) at the control input.

5. The electronic arrangement according to claim 1 further comprising a differential amplifier (OP) with one output and two inputs, the first input being connected with the control input and the second input having a constant potential ($U_{bias}$), wherein the differential amplifier (OP) is implemented as a current-voltage converter having a resistance (R2) between the first input and the output.

6. The arrangement according to claim 1 further comprising a transistor (Q2) operated in a common base circuit, with a base having a constant potential ($U_{bias}$) and an emitter connected to the control input.

7. The electronic arrangement according to claim 1 further comprising a PWM/DC-converter for the conversion of the pulse width modulated signal into a DC voltage ($U_{DC2}$).

8. The arrangement according to claim 1 wherein the control device comprises a transistor (Q1) operated in open collector mode, preferably operated in a common emitter circuit, for the generation of the signal.

9. The arrangement according to claim 1 wherein the control device comprises a transistor (Q1) operated in a common emitter circuit, for the generation of the signal.

10. The arrangement according to claim 1 wherein the control unit device comprises a PWM/DC-converter for the conversion of a DC voltage ($U_{DC1}$) into the pulse width modulated signal.

* * * * *